(12) United States Patent
Trevithick et al.

(10) Patent No.: US 9,151,412 B2
(45) Date of Patent: Oct. 6, 2015

(54) RETRACTABLE CABLE TRAY FOR VERTICAL STRUCTURES

(71) Applicants: Mark W. Trevithick, Houston, TX (US); Keith J. Orgeron, Spring, TX (US)

(72) Inventors: Mark W. Trevithick, Houston, TX (US); Keith J. Orgeron, Spring, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 79 days.

(21) Appl. No.: 13/850,190

(22) Filed: Mar. 25, 2013

(65) Prior Publication Data

US 2013/0277508 A1    Oct. 24, 2013

Related U.S. Application Data

(60) Provisional application No. 61/615,127, filed on Mar. 23, 2012.

(51) Int. Cl.
| | |
|---|---|
| *F16L 3/00* | (2006.01) |
| *F16L 3/26* | (2006.01) |
| *E21B 15/00* | (2006.01) |
| *H02G 3/04* | (2006.01) |
| *H02G 3/00* | (2006.01) |

(52) U.S. Cl.
CPC . *F16L 3/26* (2013.01); *E21B 15/00* (2013.01); *H02G 3/0456* (2013.01); *H02G 3/263* (2013.01)

(58) Field of Classification Search
USPC .............. 248/49, 68.1, 58, 65, 59, 70, 72, 73, 248/648, 651, 654; 414/22.55, 720, 913, 414/22.62, 23.546, 680, 729, 738, 740, 742, 414/746.8, 783, 701, 736, 776, 195, 85; 52/116, 117, 167.1; 403/294, 306, 327, 403/329, 397, 169, 170, 171, 172, 173, 174, 403/175, 176, 178
See application file for complete search history.

(56) References Cited

U.S. PATENT DOCUMENTS

| | | | |
|---|---|---|---|
| 4,232,845 A * | 11/1980 | Turner | 248/49 |
| 4,371,046 A * | 2/1983 | Read | 175/57 |
| 5,755,296 A | 5/1998 | Richardson et al. | |
| 6,024,181 A * | 2/2000 | Richardson et al. | 175/162 |
| 6,533,045 B1 | 3/2003 | Cooper | |
| 6,913,097 B1 | 7/2005 | Orr et al. | |
| 7,234,896 B2 | 6/2007 | Donnally et al. | |
| 7,290,621 B2 | 11/2007 | Orr et al. | |
| 7,546,987 B2 | 6/2009 | Sinkoff | |
| 8,192,129 B1 * | 6/2012 | Orgeron | 414/22.55 |
| 8,419,335 B1 * | 4/2013 | Orgeron | 414/22.55 |

(Continued)

*Primary Examiner* — Monica Millner
(74) *Attorney, Agent, or Firm* — John G. Fischer, Esq.; Jaspal S. Hare, Esq.; Scheef & Stone, L.L.P.

(57) ABSTRACT

The present invention discloses a cable tray assembly for a drilling rig or other vertical structure. In one embodiment, an extendable cable tray assembly is provided for retractable attachment to a section of a mast of a drilling rig. The cable tray assembly includes an upper tray connected to the mast in a stationary relationship. A center tray has a pivot end pivotally connected to the mast, and an articulating end rotatable between a stowed position and a deployed position below, and offset to, the upper tray. A lower tray has an upper end and a lower end. The upper end is pivotally connected to the articulating end of the center tray. The lower tray is movable between a stowed position and a deployed position below, and offset to, the center tray. An actuator is provided such that extension and retraction of the actuator results in deployment and retraction of the cable tray assembly.

18 Claims, 11 Drawing Sheets

(56) References Cited

U.S. PATENT DOCUMENTS

| | | | |
|---|---|---|---|
| 8,506,229 B2* | 8/2013 | Orgeron | 414/22.55 |
| 8,550,174 B1* | 10/2013 | Orgeron et al. | 166/380 |
| 8,696,288 B2* | 4/2014 | Orgeron | 414/22.55 |
| 2004/0003935 A1* | 1/2004 | Colmart et al. | 174/48 |
| 2005/0040295 A1* | 2/2005 | Sinkoff | 248/58 |
| 2006/0104747 A1* | 5/2006 | Zahn et al. | 414/22.63 |
| 2009/0084910 A1* | 4/2009 | White | 248/70 |
| 2010/0078528 A1 | 4/2010 | DeFranco et al. | |

* cited by examiner

RETRACTABLE CABLE TRAY FOR VERTICAL STRUCTURES

TECHNICAL FIELD OF INVENTION

The embodiments of the present invention relate to a new retractable cable tray system for transportation of cables used in association with large vertical structures, where transportation of the structure requires disassembly and separate transport. In particular, the present invention is applicable for rapid and safe consolidation of the numerous cables associated with a drilling rig mast, such that the cables can be retracted for transportation with a single mast section of a drilling rig without the need for multiple disconnections of the cable, or spooling of the cable for transportation.

BACKGROUND OF THE INVENTION

It is a common requirement in several industries to transport very long and heavy structures across the federal and state highways. As a particular example of such requirement, in the exploration of oil, gas and geothermal energy, drilling operations are used to create boreholes, or wells, in the earth. Drilling rigs used in subterranean exploration must be transported to the locations where drilling activity is to be commenced. These locations are often remotely located and in rough terrain. The transportation of such rigs on state highways requires compliance with highway safety laws and clearance underneath bridges or inside tunnels. Once transported to the desired location, large rig components must each be moved from a transport trailer into engagement with the other components located on the drilling pad.

One of the difficult and time consuming tasks associated with relocating a drilling rig is the disconnection and storage of the numerous electrical, pneumatic, and/or hydraulic cables that must be located along the full height of the fully assembled mast. These cables connect, for example, between power supply equipment located at or below the drilling rig floor and equipment such as the top drive at or near the top of the drilling mast.

Moving a full-size rig requires disassembly of the mast into two or three sections which must then be transported. The mast sections are then loaded between a tractor trailer and a dolly system designed to follow the tractor trailer. The several cables must be disconnected at multiple points along the different mast sections, and spooled and stored for safe transportation. Safety is a paramount issue. Speed of disassembly and assembly is also a critical issue. Complete disassembly leads to errors and delay in reassembly.

It is also desirable that the cable disconnections be minimized. It is also desirable that the cable disconnections be performed at the rig floor level. It is also desirable that the storage and deployment of the cable be rapid. It is also desirable to eliminate separate spooling or handling of the cable for transportation. It is also desirable that cable be transported with a single mast section. It is necessary that the storage and deployment of the cable not damage the cables.

There remains a need for a readily deployable cable tray system that permits the rapid, safe, and reliable storage of cables associated with transportable vertical structures. In particular, there remains a need for a readily deployable cable tray system that permits the rapid, safe, and consolidated storage of cables running the vertical length of the mast, such that the cable can be disconnected at rig floor level and retracted to a single section of the mast for lawful transportation on the state highway system.

There also remains a need for a deployable cable tray system that overcomes the difficulty of being completely stored within the transport width of the mast section to which it is attached. There also remains a need for a deployable cable tray system that overcomes the difficulty of being deployable from a mast section without interfering with the internal volume of the mast framework.

In summary, the preferred embodiments of the present invention provide a unique solution to the engineering constraints and challenges of providing a rapid, safe, and consolidated storage of cables with the central section of the mast for transportation on the state highway system.

SUMMARY OF THE INVENTION

The present invention provides a substantially improved system for relocation of a drilling rig. In one embodiment, an extendable cable tray assembly is provided for retractable attachment to a section of a mast of a drilling rig. The cable tray assembly includes an upper tray connected to the mast in a stationary relationship. A center tray has a pivot end pivotally connected to the mast, and an articulating end rotatable between a stowed position adjacent to the upper tray and a deployed position below the upper tray. A lower tray has an upper end and a lower end. The upper end is pivotally connected to the articulating end of the center tray.

A linkage assembly is provided, and has a first link and a second link. The first link has a first end pivotally connected to a mast. The first link has a second end pivotally connected to the second link.

The second link has an upper end and a lower end. The upper end of the second link is pivotally connected to the second end of the first link. The lower end of the second link is pivotally connected to the center tray between the pivot end and articulating end of the center tray.

An actuator is pivotally connected to the mast and the linkage assembly such that extension and retraction of the actuator results in deployment and retraction of the cable tray assembly.

In another embodiment, a link-mast bracket is fixed to the mast. The first end of the first link is pivotally connected to the link-mast bracket.

In another embodiment, a mast-tray bracket is fixed to the mast. The pivot end of the center cable tray is pivotally connected to the mast-tray bracket.

In another embodiment, each of the upper, central, and lower sections of the tray assembly has a rigid conduit arranged in parallel orientation for receiving cable.

As will be understood by one of ordinary skill in the art, the assembly disclosed may be modified and the same advantageous result obtained, including on other vertical structures, such as cranes, where the vertical structure must be segregated into parts for transportation on state highways.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
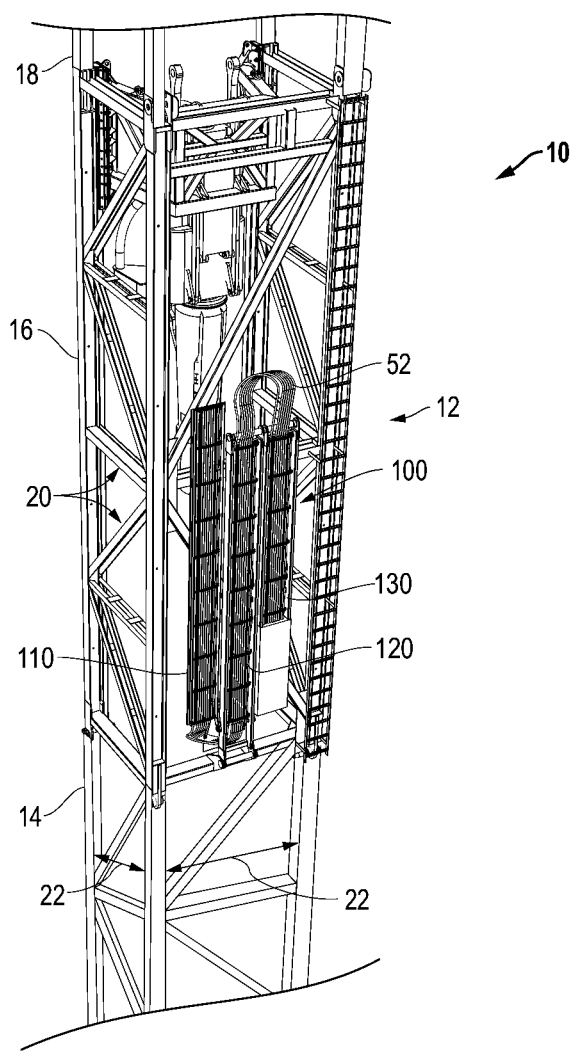
FIG. 1 is an isometric view of the cable tray assembly of the present invention in a fully stowed position, shown mounted to the center section of a drilling mast.
Figure 2:
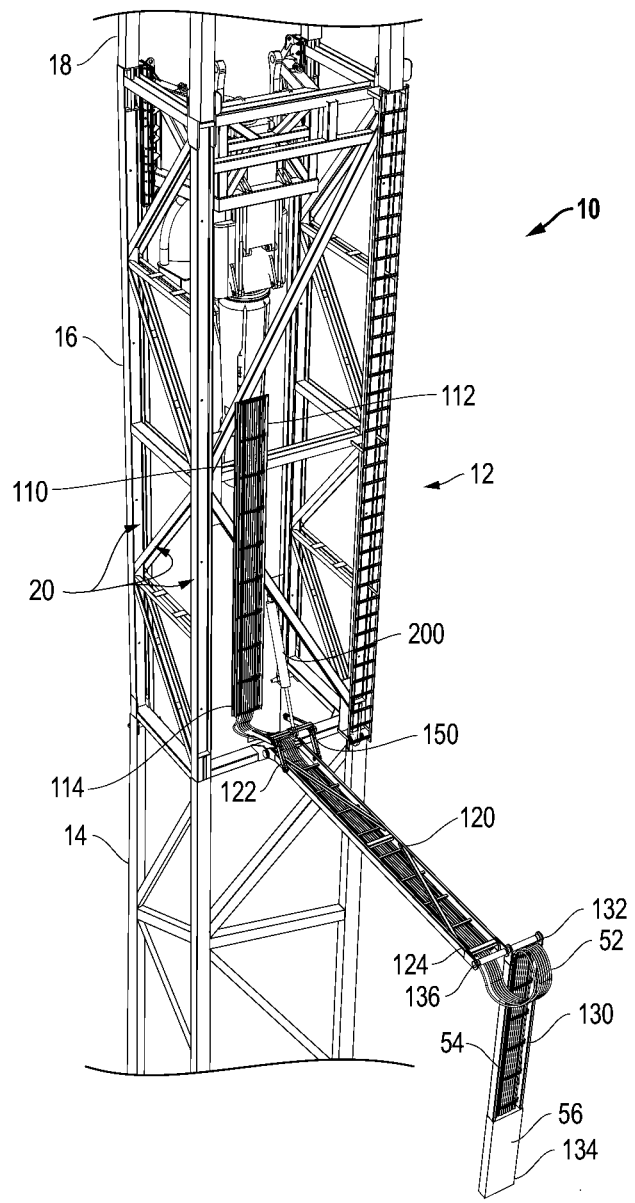
FIG. 2 is an isometric view of the cable tray assembly shown in FIG. 1 in a partially deployed position.
Figure 3:
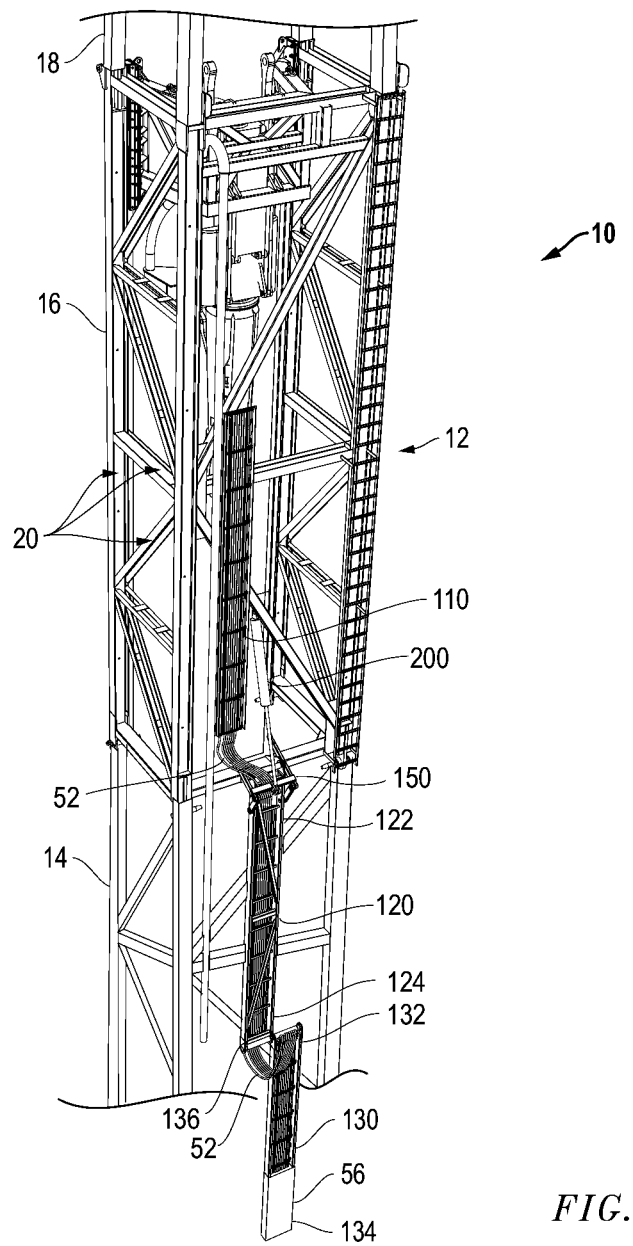
FIG. 3 is an isometric view of the cable tray assembly shown in FIGS. 1 and 2 in a fully deployed position.

FIG. 1 is an isometric view of a cable tray assembly 100 of the present invention in a fully stowed position, shown mounted to a drilling rig 10. FIG. 2 illustrates cable tray assembly 100 in a partially deployed position. FIG. 3 illustrates cable tray assembly 100 in a fully deployed position.

As seen in FIGS. 1-3, extendable cable tray assembly 100 is provided for retractable attachment to a vertical structure 10. In an exemplary application, cable tray assembly 100 is provided for retractable attachment to a section of a mast assembly 12 of a drilling rig 10. Mast assembly 12 may have two or more separable sections. In the embodiment illustrated, mast assembly 12 is comprised of a lower mast section 14, a central mast section 16, and an upper mast section 18.

In conventional drilling rigs 10, each mast section 14, 16, and 18 is comprised of a metal framework 20 that defines an external transport width 22. Framework 20 also defines an internal volume 24 (not numbered in the FIGURES) which is required for the unobstructed passage of operating equipment such as a hoist, a top drive, a swivel, and the like. For transportation of drilling rig 10, lower mast section 14, central mast section 16, and upper mast section 18 are disconnected and separated for transportation on individual truck and trailer systems.

The framework 20 of conventional drilling rigs 10 is generally rectilinear. The "drawworks side" and the "V-door side" are opposing sides of framework 20. The V-door side is adjacent to the slide and catwalk, and is used as an entry to bring in drill pipe, casing, and other tools. The drawworks side is adjacent to the floor mounted drawworks, which is the machine used for reeling the drilling line in and out. The driller's side and off-driller's side are the other opposing sides of framework 20. As the name implies, the driller's side is adjacent the control system managed by the driller.

As seen in FIGS. 1-3, cable tray assembly 100 comprises an upper tray 110, a center tray 120, and a lower tray 130. In the embodiment illustrated, cable tray assembly 100 is attached to the drawworks side of central mast section 16 of mast assembly 12. Referring to FIG. 2, upper tray 110 has an upper end 112 and a lower end 114. Upper tray 110 is connected to mast assembly 12 in stationary relationship.

Center tray 120 has a pivot end 122 and an opposite articulating end 124. Lower tray 130 has an upper end 132 and a lower end 134. Upper end 132 of lower tray 130 is pivotally connected to articulating end 124 of center tray 120 at tray-tray pivot 136. Articulating end 124 is rotatable so as to allow pivot end 122 to move center tray 120 between a stowed position above pivot end 122 and a deployed position below pivot end 122.

As seen in FIG. 1, center tray 120 is positioned in offset alignment to upper tray 110, such that when center tray 120 is in the stowed position, it is substantially adjacent, and not in conflict with upper tray 110.

As seen in FIG. 1, lower tray 130 is positioned in offset alignment to center tray 120, such that when lower tray 130 is in the stowed position, it is substantially adjacent, and not in conflict with center tray 120. As seen in FIGS. 2 and 3, a plug panel 56 is located proximate to lower end 134 of lower tray 130. Plug panel 56 provides a securable cover and access to connectable ends of cables 50.

Figure 4:
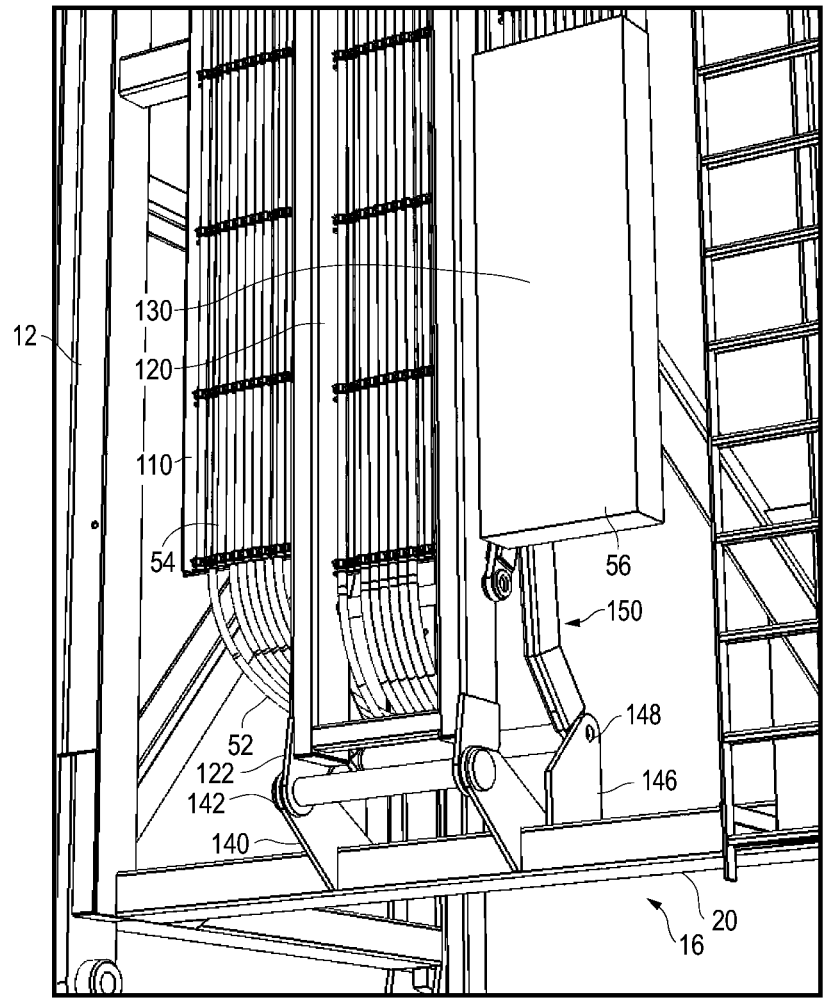
FIG. 4 is an isometric close-up view of the linkage assembly of the cable tray assembly shown in FIG. 1, in a fully stowed position.

FIG. 4 is an isometric close-up view of a linkage assembly 150 of cable tray assembly 100 shown in FIG. 1, in a fully stowed position. Linkage assembly 150 is pivotally connected to mast assembly 12 and to center tray 120. Linkage assembly 150 is pivotally connected to mast assembly 12 at link-mast pivot 148. In the embodiment illustrated, a link-mast bracket 146 is attached in fixed relation to mast assembly 12 to facilitate connection of link-mast pivot 148. Also in the embodiment illustrated, link-mast bracket 146 is configured to locate link-mast pivot 148 external to internal volume 24 of mast assembly 12.

Pivot end 122 of center tray 120 is pivotally connected to mast assembly 12. In the embodiment illustrated, pivot end 122 is pivotally connected to mast assembly 12 by mast-tray pivot 142. Also in the embodiment illustrated, mast-tray bracket 140 is attached in fixed relation to mast assembly 12 to facilitate connection of mast-tray pivot 142.

Figure 5:
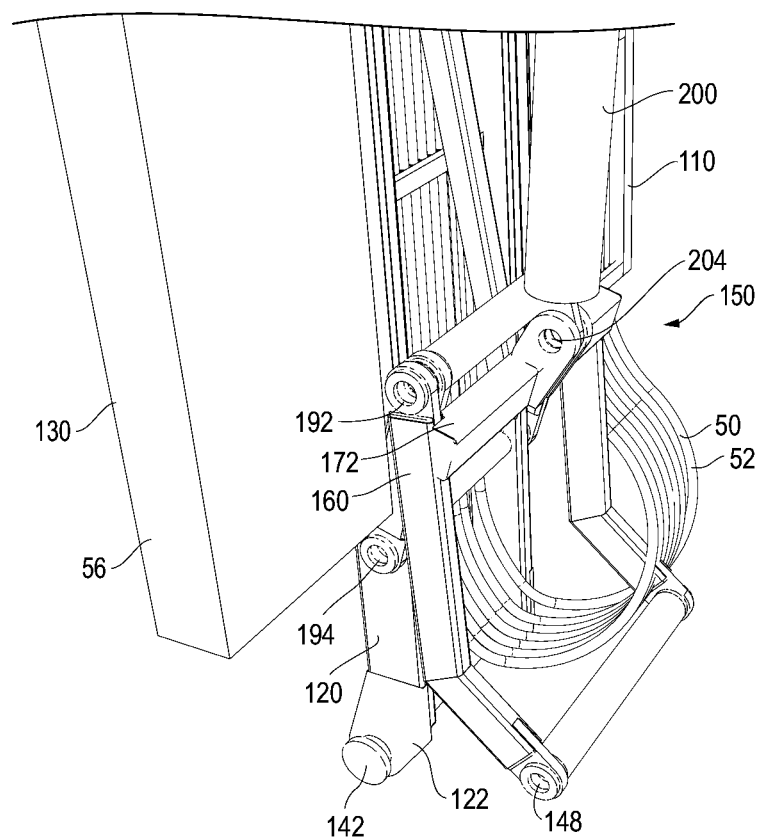
FIG. 5 is an isometric close-up view of the linkage assembly of the cable tray assembly shown in FIG. 1, in a fully stowed position, with the drilling mast assembly removed for clarity.
Figure 6:
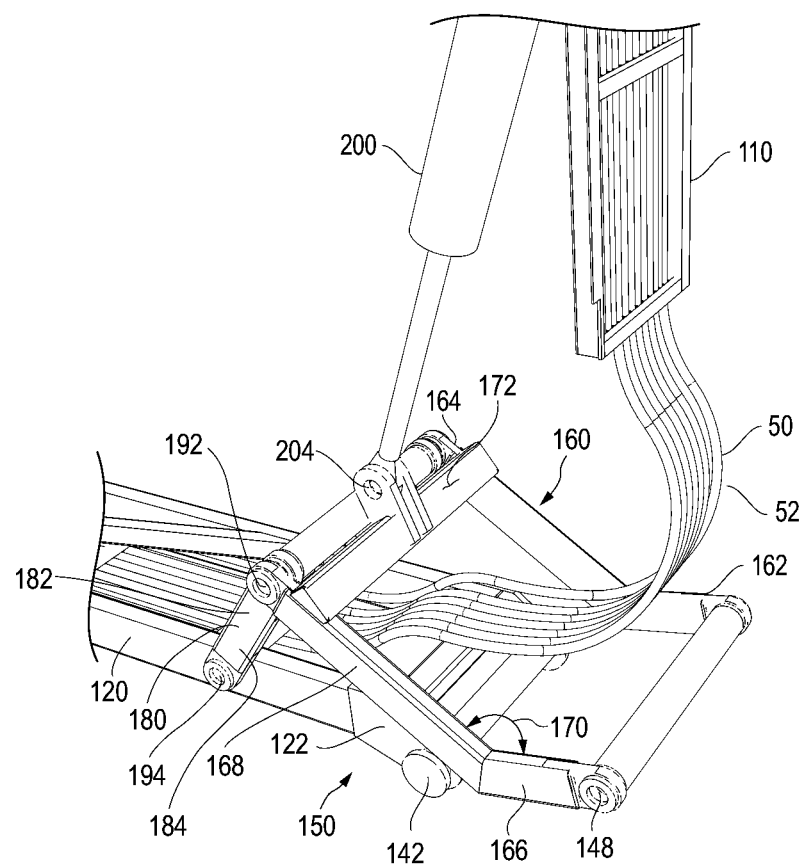
FIG. 6 is an isometric close-up view of the linkage assembly of the cable tray assembly shown in FIG. 2, in the partially deployed position, with the drilling mast assembly removed for clarity.
Figure 7:
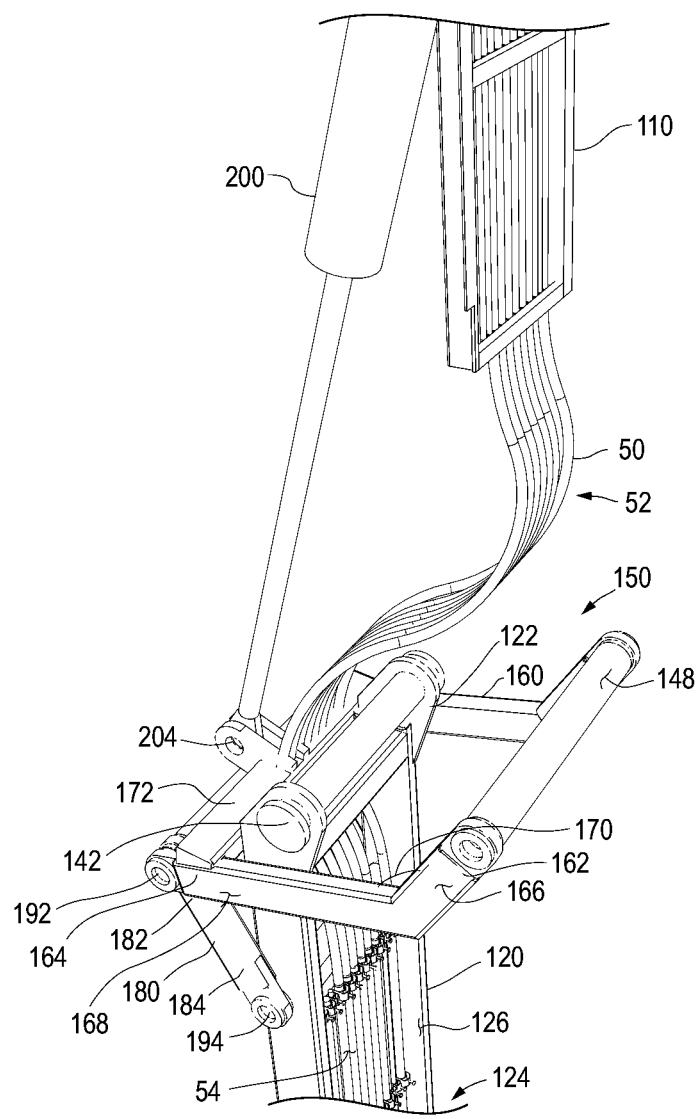
FIG. 7 is an isometric close-up view of the linkage assembly of the cable tray assembly shown in FIG. 3, in the fully deployed position, with the drilling mast assembly removed for clarity.

FIG. 5 is an isometric close-up view of linkage assembly 150 of the cable tray assembly 100 as shown in FIG. 1, in a fully stowed position, with drilling mast assembly 12 removed for viewing clarity. FIG. 6 and FIG. 7 are similar views, illustrating cable tray assembly 100 in the partial deployed ad fully deployed positions respectively.

Referring to FIGS. 6 and 7, linkage assembly 150 comprises a first link 160 and a second link 180. First link 160 has a first end 162 and a second end 164. Second link 180 has an upper end 182 and a lower end 184.

Several pivoting connections are provided by the present invention. In the embodiment illustrated, and as will be further described below, first link 160 is pivotally connected between mast assembly 12 and second link 180. Second link 180 is pivotally connected between first link 160 and center tray 120. Center tray 120 is pivotally connected between mast assembly 12 and lower tray 130 (not shown). Center tray 120 is also pivotally connected to second link 180.

First end 162 of first link 160 is pivotally connected to mast assembly 12 at link-mast pivot 148. As shown in FIG. 4, link-mast bracket 146 may be used to provide a convenient mounting location for link-mast pivot 148. In one embodiment, first link 160 also has a mast-side section 166 and a tray-side section 168. In this embodiment, mast-side section 166 is angularly disposed to tray-side section 168, forming angle 170.

Second end 164 of first link 160 is pivotally connected to upper end 182 of second link 180 by link-link pivot 192. Lower end 184 of second link 180 is pivotally connected to center tray 120 at a point between pivot end 122 and articulating end 124 of center tray 120.

Referring to FIGS. 5-7, an actuator 200 is provided for controlled deployment and retraction of cable tray assembly 100. In the preferred embodiment, actuator 200 is a hydraulic cylinder. Actuator 200 is pivotally connected between mast assembly 12 and linkage assembly 150. Actuator 200 is pivotally connected to mast assembly 12 at actuator-mast pivot 202 (not shown). Actuator-mast pivot 202 is located on framework 20 of central mast section 16, on the same side (drawworks side) of mast assembly 12 as cable tray assembly 100. Actuator-mast pivot 202 is located on the interior of framework 20. Actuator 200 is pivotally connected to linkage assembly 150 at actuator-linkage pivot 204.

Figure 8:
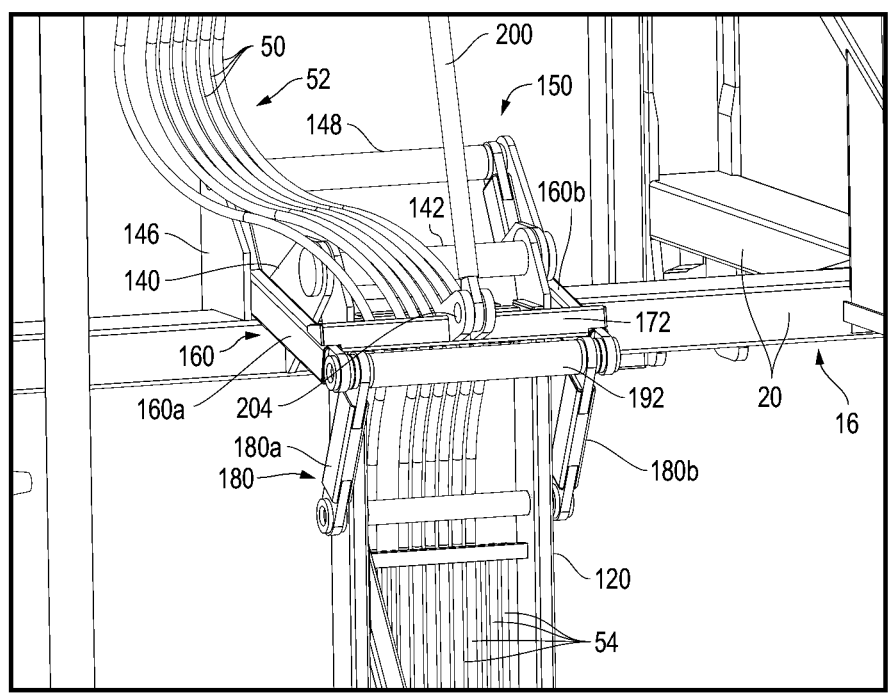
FIG. 8 is another isometric close-up view of the linkage assembly of the cable tray assembly shown in FIG. 3, in the fully deployed position, with the drilling mast assembly removed for clarity.

FIG. 8 is another isometric close-up view of the linkage assembly of the cable tray assembly shown in FIG. 3, in the fully deployed position, with the drilling mast assembly removed for clarity. As illustrated in the several figures, and as identified in FIG. 8, first link 160 may be comprised of a pair of parallel sides 160a and 160b. Also as illustrated, second link 180 may be comprised of a pair of parallel sides 180a and 180b.

In the embodiment illustrated, actuator 200 is pivotally connected to linkage assembly 150 at first link 160. Also in the embodiment illustrated, a brace 172 is provided on first link 160, spanning between sides 160a and 160b. In this embodiment, actuator-linkage pivot 204 is connected to brace 172. Brace 172 acts, in part, to connect sides 160a and 160b in spaced-apart relation, and to stabilize first link 160. As seen in this embodiment, the distance between sides 160a and 160b of first link 160 is greater than the width of center tray 120, such that center tray 120 may pass between sides 160a and 160b. Alternatively, first link 160 and second link 180 rotate in planes offset to the width of center tray 120.

In the embodiment illustrated in the several drawings, a plurality of conduits 54 are provided in parallel arrangement on each of upper tray 110, center tray 120 and lower tray 130. Cable 50 is run through the interior of the conduits 54 where possible.

Also as illustrated, each cable 50 has a free section 52 between lower tray 130 and center tray 120 which is not internal to a conduit 54. Each cable 50 also has a free section 52 between center tray 120 and upper tray 110 which is not internal to a conduit 54.

Operation

Cable tray assembly 100 is provided for retractable attachment to a vertical structure 10. In an exemplary application, cable tray assembly 100 is provided for retractable attachment to a section of a mast assembly 12 of a drilling rig 10. In one embodiment of this application, cable tray assembly 100 is connected to central mast section 16 of mast assembly 12.

In this embodiment, upper tray 110 remains fixed to central mast section 16. Center tray 120 is pivotally connected to central mast section 16. Linkage assembly 150 is pivotally connected to central mast section 16 and to center tray 120. Lower tray 130 is pivotally connected to articulating end 124 of center tray 120.

A hydraulic or other actuator 200 is pivotally connected between linkage assembly 150 and central mast section 16. Retraction of actuator 200 results in retraction of cable tray assembly 100 to position center tray 120 substantially adjacent to upper tray 110, and to position lower tray 130 substantially adjacent to center tray 120. Excess cable 50 is provided to prevent kinking and damage to cable 50.

In the embodiment illustrated, link-mast bracket 146 is configured to locate link-mast pivot 148 external to internal volume 24 of mast assembly 12, and thus prevent or limit interference of cable tray assembly 100 with internal volume 24.

Also in the embodiment illustrated, mast-tray bracket 140 is inclined away from internal volume 24 and framework 20 of mast assembly 12 to position link-tray pivot 194 external to framework 20 such that center tray 120 and lower tray 130 will be positioned in close proximity to the exterior of framework 20 when in the retracted position and in the deployed position.

In one preferred embodiment, the distance between mast-tray pivot 142 and mast-link pivot 148 is between 12" and 24".

Expansion of actuator 200 results in deployment of cable tray assembly 100 to position center tray 120 substantially beneath and offset to upper tray 110, and to position lower tray 130 substantially beneath and offset to center tray 120. Excess cable 50 is provided to reach the extent of the offset and avoid kinking and damage to cable 50.

When cable tray assembly 100 is deployed, angle 170 between mast-side section 166 and tray-side section 168 provides a space for free section 52 consisting of cable 50.

In operation, first link 160, second link 180, center tray 120, and mast assembly 12 constitute an intersecting 4-bar mechanism. In the embodiment illustrated, mast assembly 12, as between link-mast pivot 148 and mast-tray pivot 142, functions as a stationary ground link. First link 160 functions as a driver. Second link 180 functions as a coupler. Center tray 120, as between link-tray pivot 194 and mast-tray pivot 142, functions as a follower.

To perform in accordance with the embodiment illustrated, the path of the driver must intersect the path of the follower (and the ground link). Therefore, first link 160 and cable tray 120 must rotate in separate planes or be offset configured to avoid conflict when rotating past each other. As best seen on FIG. 8, the distance between parallel sides 160a and 160b of first link 160 is greater than the width of center tray 120, to allow center tray 120 to pass between sides 160a and 160b of first link 160 on deployment of linkage assembly 150.

In a preferred embodiment, cable 50 is run through the conduits 54. Conduits 54 are solid and keep cable 50 in secured alignment and attachment to upper tray 110, center tray 120 and lower tray 130 during deployment, retraction, and transportation. Additionally, by virtue of being connected to upper tray 110, center tray 120 and lower tray 130, conduits 54 provide protection to cables 50 during drilling operations, or during the operation of any other vertical structure to which the invention is applied.

Actuator-mast pivot 202 (not shown) is located on the interior side of framework 20, and actuator 200 is pivotally connected to linkage assembly 150 at actuator-linkage pivot 204. In this arrangement, actuator 200 is in angular relationship to framework 20 and partially outside of interior volume 24 when cable tray assembly 100 is deployed. In this configuration, actuator 200 does not interfere with the required machine activity within interior volume 24 of mast assembly 12.

Figure 9:
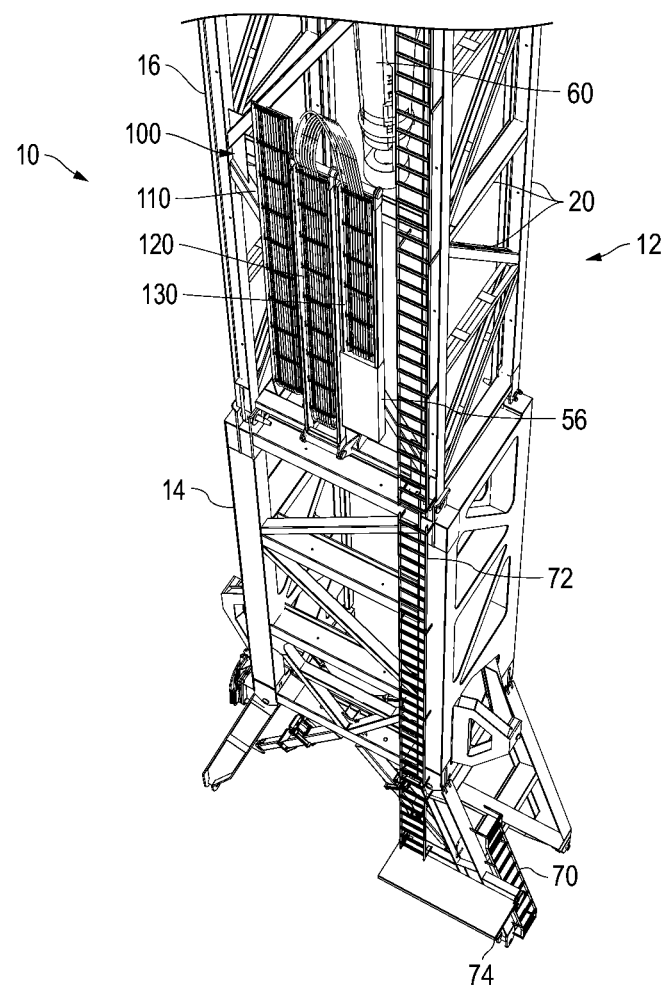
FIG. 9 is an isometric view of the cable tray assembly of the present invention in a fully stowed position, shown mounted to the center section of a drilling mast.
Figure 10:
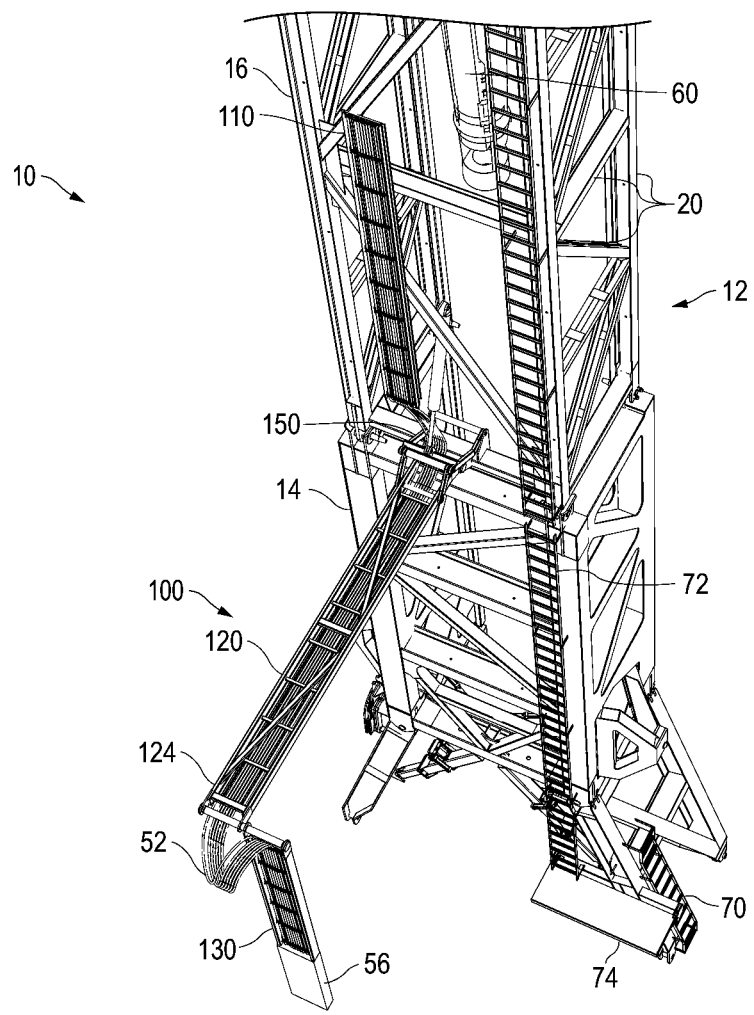
FIG. 10 is an isometric view of the cable tray assembly of the present invention in a partially deployed position, shown mounted to the center section of a drilling mast.
Figure 11:
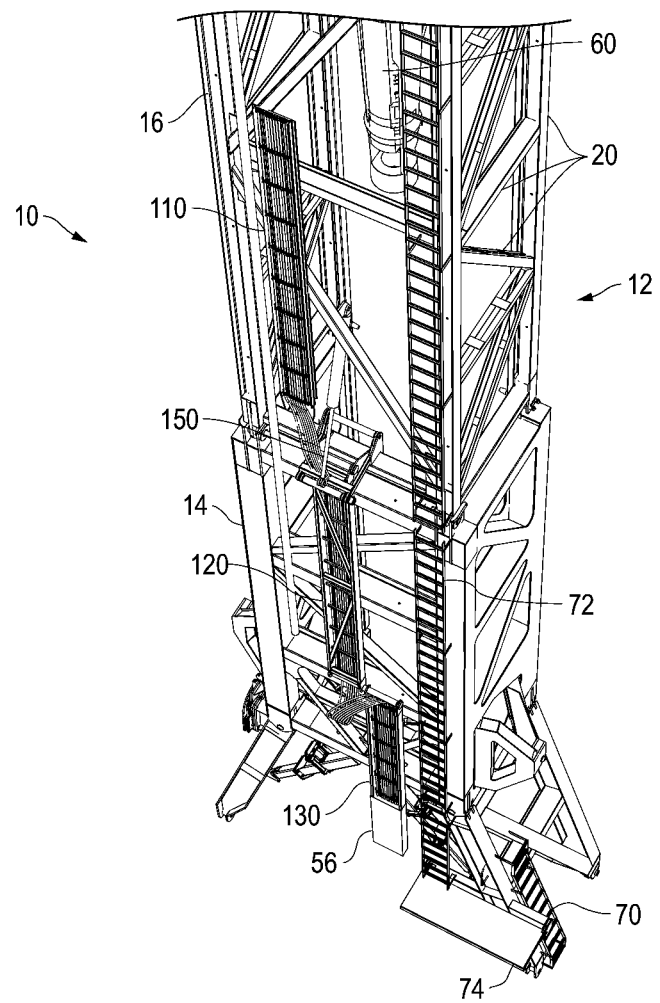
FIG. 11 is an isometric view of the cable tray assembly of the present invention in a fully deployed position, shown mounted to the center section of a drilling mast, and extending to the lower section of the mast, where a platform is provided for access.

FIGS. 9, 10, and 11 are isometric views of cable tray assembly 100 of the present invention shown of drilling rig 10 in a fully stowed position, partially deployed, and fully deployed positions, respectively. In FIG. 9, cable tray assembly 100 is illustrated in the fully stowed position. In this position, cables 50 (not shown) are disconnected from their supply source near the floor of drilling rig 10. FIG. 10 is illustrates the lowering of center tray 120 and lower tray 130 during deployment. As seen, articulating end 124 of center tray 120 and lower tray 130 rotate away from mast assembly 12 during deployment.

FIG. 11 illustrates cable tray assembly 100 in the fully deployed position. As seen, in this position, center tray 120 is positioned substantially vertical and beneath linkage assembly 150, and in front of lower mast section 14. Lower tray 130 is also positioned substantially vertical and in front of lower mast section 14. Plug panel 56 is now at the lowest position of cable tray assembly 100.

As seen in FIGS. 9, 10, and 11, drilling rig 10 has a platform ladder 70 and a mast ladder 72 that permits scaling of mast assembly 12 by employees willing to do so. A platform 74 is provided to permit ready access to plug panel 56 at a low height above the floor of drilling rig 10.

When cable tray assembly 100 is fully deployed, employees may access plug panel 56 from platform 74. It is anticipated that plug panel 56 will have a lockable door cover as shown, to comply with OSHA safety regulations. When power sources are secured (locked-out, tagged-out), the required connections to cables 50 inside plug panel 56 can be made. These connections may include hydraulic, pneumatic, coolant, lubricant, electrical power, electrical communications or another such connections.

As seen in FIGS. 9, 10, and 11, a top drive mechanism 60 is commonly provided within internal volume 24 of framework 20 of mast assembly 12. Top drive 60 will have an umbilical connection or junction box for the attachment of numerous cables 50 serving various functions. A benefit of the present invention is that top drive 60 may remain connected to cables 50 and may be transported with cable assembly 100. Thus, there is a single disconnection required of each cable 50 required for transport of center mast section 16, and that connection can be prepared on platform 74 prior to retraction of cable tray assembly 100.

In another embodiment, a hydraulic speed control device 250 (not shown) is provided to control the rate of actuation of actuator 200 such that the deployment of articulating end 124 of center tray 120 and lower tray 130 is limited to an acceptable speed as they rotate away from mast assembly 12. Where actuator 200 is a hydraulic cylinder, speed control device 250 limits the flow rate through hydraulic cylinder actuator 200.

In another embodiment, a cam assembly 260 (not shown) is provided to control the deployment speed of articulating end 124 of center tray 120 and lower tray 130 is limited to an acceptable rate of speed as they rotate away from mast assembly 12. In another embodiment, cam assembly 260 may be a dyad linkage.

As illustrated, the invention provides a unique solution to the engineering constraints and challenges of providing a rapid, safe, and consolidated storage of cables 50 with a segregated vertical structure. In particular, the invention provides a unique solution that is properly sized and configured to overcome the engineering constraints and challenges of providing a rapid, safe, and consolidated storage of cables 50 with central mast section 16 of a drilling rig 10 for segregating mast assembly 12 for transportation on the state highway system.

As used herein, the term "substantially" is intended for construction as meaning "more so than not."

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An extendable cable tray assembly for retractable attachment to a section of a mast of a drilling rig comprising:
   an upper tray connected to the mast in stationary relationship;
   a center tray having a pivot end pivotally connected to the mast, and having an articulating end rotatable between a stowed position above the pivot end, and a deployed position below the pivot end;
   the center tray positioned in offset relationship to the upper tray;
   a lower tray having an upper end and a lower end;
   the upper end of the lower tray being pivotally connected to the articulating end of the center tray;
   the lower tray positioned in offset relationship to the center tray;
   an actuator, pivotally connected between the mast and the center tray;
   wherein retraction of the actuator results in retraction of the cable tray assembly to position the center tray substantially adjacent to the upper tray and adjacent the mast, and the lower tray substantially adjacent to the center tray and adjacent the mast; and,
   wherein extension of the actuator results in deployment of the cable tray assembly to position the center tray substantially below and offset to the upper tray and the lower tray substantially below and offset to the center tray.

2. The cable tray assembly of claim 1 further comprising:
   the actuator comprising a cylinder for moving the central and lower cable trays between their respective stowed and deployed positions; and,
   the cylinder having one end pivotally connected to the mast and an opposite end pivotally connected to the center tray.

3. The cable tray assembly of claim 1 further comprising:
   a plurality of cables; and,
   each cable attached to each of the lower tray, center tray, and upper tray.

4. An extendable cable tray assembly for retractable attachment to a section of a mast of a drilling rig comprising:
- an upper tray connected to the mast in stationary relationship;
- a center tray having a pivot end pivotally connected to the mast, and having an articulating end rotatable between a stowed position above the pivot end, and a deployed position below the pivot end;
- the center tray positioned in offset alignment with the upper tray;
- a linkage assembly comprising:
  - a first link having a first end pivotally connected to the mast and a second end, and,
  - a second link having an upper end pivotally connected to the second end of the first link and a lower end pivotally connected to the center tray;
- a lower tray having an upper end and a lower end;
- the upper end of the lower tray pivotally connected to the articulating end of the center tray;
- an actuator, pivotally connected at one end to the mast, and pivotally connected at an opposite end to the linkage assembly; and,
- wherein retraction of the actuator results in retraction of the cable tray assembly to position the center tray substantially adjacent to the upper tray and the lower tray substantially adjacent to the center tray.

5. The cable tray assembly of claim 4 further comprising:
the second link being pivotally connected to the center tray between the pivot end and the articulating end of the center tray.

6. The cable tray assembly of claim 4 further comprising:
the mast having a framework;
a link-mast bracket attached to the framework; and,
the first end of the first link pivotally connected to the link-mast bracket at a location substantially within an exterior edge of the framework.

7. The cable tray assembly of claim 4 further comprising:
the mast having a framework;
a mast-tray bracket attached to the framework; and,
the pivot end of the center tray pivotally connected to the mast-tray bracket at a location exterior to an exterior edge of the framework, and in close proximity to the framework.

8. The cable tray assembly of claim 7 further comprising:
a plurality of rigid conduits located in substantially parallel alignment on each of the lower tray, center tray, and upper tray;
the cables being located one each, internal to the conduit;
each cable having a free section between the lower tray and center tray which is not internal to a conduit; and,
each cable having a free section between the center tray and upper tray which is not internal to a conduit.

9. The cable tray assembly of claim 4 further comprising:
the first link having a mast-side section and a tray-side section; and,
the mast-side section being angularly disposed to the tray-side section.

10. The cable tray assembly of claim 4 further comprising:
a brace attached to the first link; and,
the actuator being pivotally connected to an actuator-linkage pivot on the brace.

11. The cable tray assembly of claim 4 further comprising:
a plurality of cables; and,
each cable attached to each of the lower tray, center tray, and upper tray.

12. The cable tray assembly of claim 11 further comprising:
a plurality of rigid conduits located in substantially parallel alignment on each of the lower tray, center tray, and upper tray;
the cables being located one each, internal to each one of the plurality of conduits;
each cable having a free section between the lower tray and center tray which is not internal to one of the plurality of conduit; and,
each cable having a free section between the center tray and upper tray which is not internal to one of the plurality of conduits.

13. The cable tray assembly of claim 4 further comprising:
the first link comprised of a pair of spaced-apart sides defining a distance between the spaced-apart sides;
the center tray having a width;
the distance between the spaced-apart sides of the first link being greater than the width of the center tray, such that the center tray can pass between the spaced-apart sides upon deployment of the cable tray assembly.

14. The cable tray assembly of claim 4 further comprising:
a distance defined between the pivot end of the center tray pivotally connected to the mast and the first end of the first link pivotally connected to the mast;
the distance being between 12" and 24".

15. An extendable cable tray assembly for retractable attachment to a section of a mast of a drilling rig comprising:
- an upper tray connected to the mast in stationary relationship;
- a center tray having a pivot end pivotally connected to the mast, and having an articulating end rotatable between a stowed position above the pivot end, and a deployed position below the pivot end;
- the center tray positioned in offset alignment with the upper tray;
- a linkage assembly comprising:
- a first link having a first end and a second end; and,
- a second link having an upper end and a lower end;
- the first end of the first link pivotally connected to the mast;
- the second end of the first link pivotally connected to the upper end of the second link;
- the lower end of the second link pivotally connected to the center tray between the pivot end and the articulating end of the center tray;
- a lower tray having an upper end and a lower end;
- the upper end of the lower tray being pivotally connected to the articulating end of the center tray, in offset relationship;
- an actuator, pivotally connected between the mast and the linkage assembly;
- wherein retraction of the actuator results in retraction of the cable tray assembly to position the center tray substantially adjacent to the upper tray and the lower tray substantially adjacent to the center tray; and,
- wherein extension of the actuator results in deployment of the cable tray assembly to position the center tray substantially below and offset to the upper tray and the lower tray substantially below and offset to the center tray.

16. An extendable cable tray assembly for retractable attachment to a section of a mast of a drilling rig comprising:
- an upper tray connected to the mast in stationary relationship;
- a center tray having a pivot end pivotally connected to the mast, and having an articulating end rotatable between a stowed position above the pivot end, and a deployed position below the pivot end;

the center tray positioned in offset alignment with the upper tray;
a linkage assembly having a first link pivotally connected to the mast;
a second link having an upper end pivotally connected to the first link, and a lower end pivotally connected to the center tray;
a lower tray having an upper end and a lower end;
the upper end of the lower tray pivotally connected to the articulating end of the center tray;
an actuator, pivotally connected at one end to the mast, and pivotally connected at an opposite end to the linkage assembly; and,
wherein retraction of the actuator results in retraction of the cable tray assembly to position the center tray substantially adjacent to the upper tray and the lower tray substantially adjacent to the center tray.

17. An extendable cable tray assembly for retractable attachment to a section of a mast of a drilling rig comprising:
an upper tray, a center tray, and a lower tray;
a first link, a second link, and an actuator;
the upper tray connected to the mast in stationary relationship;
a first pivot connection connecting the center tray to the mast;
a second pivot connection connecting the center tray to the lower tray;
a third pivot connection connecting the first link to the mast;
a fourth pivot connection connecting the first link to the second link;
a fifth pivot connection connecting the second link to the center tray;
a sixth pivot connection connecting the actuator to the mast; and,
a seventh pivot connection connecting the actuator to the first link.

18. The cable tray assembly of claim 1 further comprising:
a linkage assembly having a first link having a first end pivotally connected to the mast a second link having an upper end pivotally connected to the first link, and a lower end pivotally connected to the center tray;
a first end of the actuator pivotally connected to the mast; and,
a second end of the actuator pivotally connected to the link assembly,
thereby the actuator is pivotally connected between the mast and the center tray via the linkage assembly.

* * * * *